Feb. 22, 1938.  E. E. HEWITT  2,109,045
FLUID PRESSURE BRAKE
Filed Aug. 1, 1935  3 Sheets-Sheet 1

Fig.1

INVENTOR
ELLIS E. HEWITT.
BY Wm. H. Cady
ATTORNEY

Feb. 22, 1938. E. E. HEWITT 2,109,045
FLUID PRESSURE BRAKE
Filed Aug. 1, 1935 3 Sheets-Sheet 3

INVENTOR
ELLIS E. HEWITT.
BY Wm. M. Cady
ATTORNEY

Patented Feb. 22, 1938

2,109,045

UNITED STATES PATENT OFFICE 2,109,045

FLUID PRESSURE BRAKE

Ellis E. Hewitt, Edgewood, Pa., assignor to The Westinghouse Air Brake Company, Wilmerding, Pa., a corporation of Pennsylvania Application August 1, 1935, Serial No. 34,144

8 Claims. (Cl. 303—19)

This invention relates to fluid pressure brakes, and more particularly to fluid pressure brakes for high speed trains and vehicles.

This application is a continuation in part of my pending application Serial No. 741,063, filed August 23, 1934, for a Brake equipment. In the aforesaid pending application I have described and claimed a brake equipment for high speed trains and vehicles, and have there set forth in detail the functioning of a valve mechanism, referred to as an emergency valve device, in interlocking the straight air and automatic portions of the brake equipment disclosed, in a manner such that upon initiating an emergency application of the brakes both the straight portion and the automatic portion are conditioned to effect the application to a maximum degree, so that upon failure of one portion the other becomes effective.

It is a principal object of the present invention to provide improved valve mechanisms, of the above referred to character, which are suitable for use with brake equipments of the type disclosed in the aforesaid pending application.

It is a further object of this invention to provide valve mechanisms suitable for use with high speed train brake equipments which will be operated upon a reduction in pressure to effect an emergency application to a maximum degree and to at the same time condition related control apparatus to permit a maximum rate of retardation.

A still further object of the invention is to provide a valve mechanism of the character aforesaid which will be effective in producing an accelerated application of the brakes when effecting emergency applications.

Further objects and advantages of the invention, dealing with specific constructions and arrangements of parts, will be apparent from the following description, which is taken in connection with the attached drawings, wherein.

In order that the several embodiments of the invention may be clearly understood, they have been shown in connection with simplified forms of high speed train brake equipment, but it is to be understood that it is intended that valve mechanisms embodying the invention may be employed in various types and forms of brake equipments, and in particular in the type disclosed in my aforesaid pending application.

Figure 1:
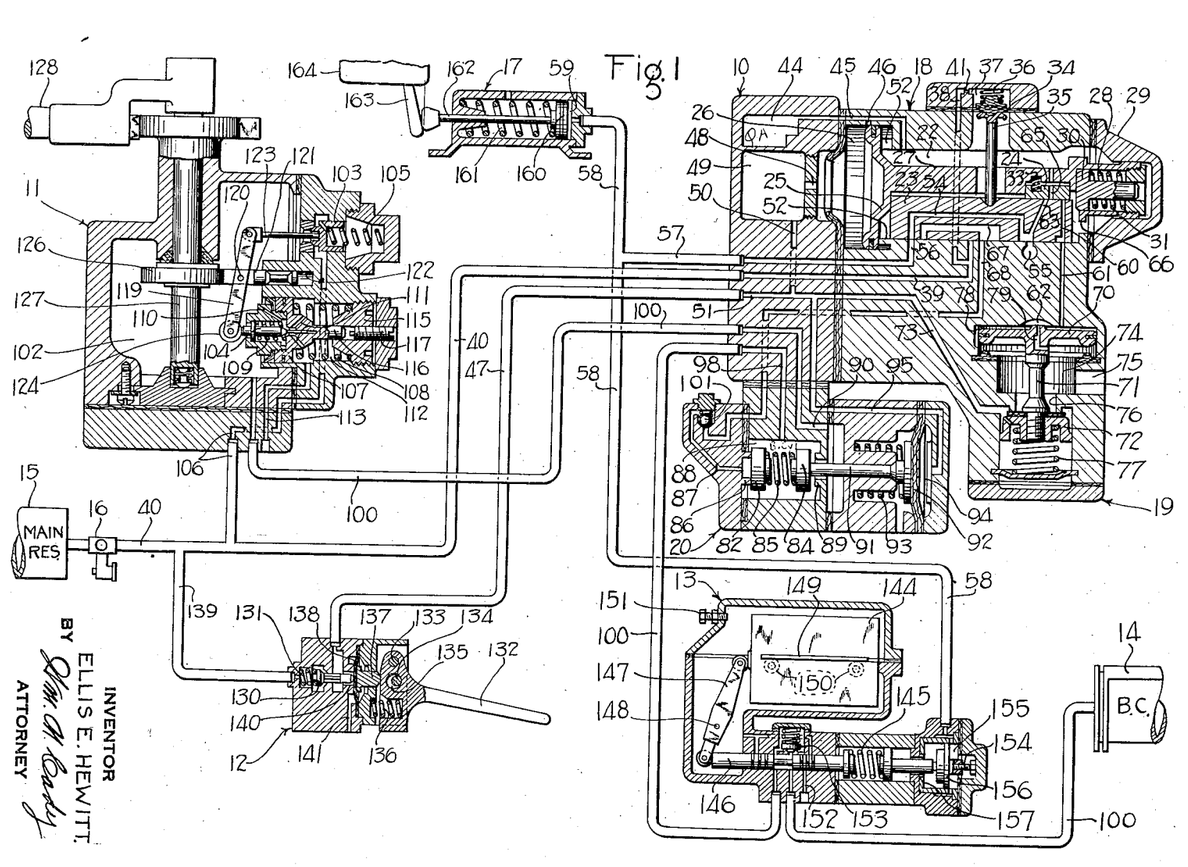
Fig. 1 is a view showing in diagrammatic form an embodiment of the invention arranged schematically in a simplified form of high speed train brake equipment.

*Embodiment shown in Fig. 1*

Considering now the embodiment shown in Fig. 1, I have shown this form of my improved valve mechanism as embodied in a composite unit designated by the numeral 10, and associated with a brake system comprising a brake valve device 11, a safety control valve device 12, a retardation controller device 13, a brake cylinder 14, a main reservoir 15, a feed valve device 16, and a circuit breaker operating cylinder 17.

My improved valve mechanism, shown at 10, comprises a main valve portion 18, a vent valve portion 19, and a straight air interlock valve portion 20.

The main portion 18 is provided with a main slide valve chamber 22 in which is disposed a main slide valve 23 and on top of the main slide valve a graduating valve 24. For operating the main and graduating valves there is provided an emergency piston 25 disposed in a piston chamber 26 and having a stem 27. The stem 27 is provided with a tail portion 28 slidably interfitting with a bore in a cap 29. The tail portion 28 carries a slidable tail stop 30 which is urged to the left by a spring 31, and which is adapted to engage the right end of the main slide valve 23 when the piston 25 moves to the left.

The stem 27 is recessed to receive the graduating valve 24 so as to move this valve coextensive with movement of the piston. A spring 33 is interposed between the stem 27 and the graduating valve 24, so as to hold the valve in engagement with the main slide valve 23.

The main slide valve 23 is held upon its seat by a loading mechanism comprising a flexible diaphragm 34 mounted in the casing and adapted to be urged into engagement with a rocking pin 35 bearing upon the main slide valve. A spring 36 exerts a constant downward pressure upon the flexible diaphragm 34, while additional pressure may be exerted downwardly upon the diaphragm by the supply of fluid under pressure to chamber 37 above the diaphragm.

The chamber 37 is at all times in communication with the aforementioned feed valve device 16 by way of passages 38 and 39, and pipe 40, so that the pressure in chamber 37 will correspond to the setting of the feed valve device 16. A choke 41 is provided in the passage 38 adjacent the chamber 37, so that if the diaphragm 34 should become ruptured during operation of the valve mechanism 10, undue loss of fluid from the feed valve device will not take place.

The slide valve chamber 22 is in communication with a quick action chamber 44, formed in the casing of the main portion 18, by way of passage 45. The passage 45 is at times in communication with the piston chamber 26 by way of port 46. This communication is open so long as the piston 25 is in its right hand position, as shown in the drawings, and is adapted to be closed when the piston moves to the left.

The emergency piston chamber 26 is at all times in communication with a pipe 47, which is adapted to be normally charged with fluid under pressure, by way of port 48, a chamber 49, and passages 50 and 51. The pipe 47 may be any of the normally charged pipes commonly employed in automatic brake systems, such for example as the safety control pipe, the brake pipe, or the emergency pipe. For the purpose of convenience, the pipe 47 will hereinafter be referred to as the safety control pipe, but it is to be understood that this designation is merely by way of illustration and is not intended to indicate a limitation in the use of my improved valve mechanism.

When the safety control pipe 47, and piston chamber 26, are normally charged with fluid under pressure, the piston 25 is maintained in its right hand position against stops 52. In this position of the piston a port 54 in the main slide valve 23 connects an exhaust port 55 with a passage 56 leading by way of pipes 57 and 58 to a chamber 59 in the aforementioned circuit breaker operating cylinder 17. At the same time, another port 60 in the main slide valve registers with a passage 61 leading to a piston chamber 62 in the vent valve portion 19.

For this position of the emergency piston 25 the graduating valve 24 blanks the main slide valve port 60 and also blanks a second main slide valve port 63.

When the pressure in the piston chamber 26 is initially reduced so that the pressure in the slide valve chamber 22 slightly overbalances that in the piston chamber 26, piston 25 moves to the left until tail stop 30 engages the right end of main slide valve 23, at which time motion of the piston is arrested. The graduating valve 24 is then in a position where a port 65 therein registers with the port 63 in the main slide valve, while the graduating valve continues to blank the main slide valve port 60. At the same time, the piston 25 blanks the port 46 connecting the piston chamber 26 with the passage 45 leading to the quick action chamber 44.

If now the piston 25 is caused to move further to the left, tail spring 31 will be compressed and when this spring has been compressed to the point where the lower edge 66 of the tail portion 28 has engaged the main slide valve 23, the graduating valve 24 will have blanked the main slide valve port 63 and uncovered the main slide valve port 60. Thereafter, further movement of piston 25 to the left will carry main slide valve 23 to application position, where passage 56 is disconnected from exhaust port 55, the exhaust port 55 blanked by the main slide valve, and where cavity 67 in the main slide valve connects a passage 68 to both passages 39 and 56. At the same time, the main slide valve uncovers the aforementioned passage 61 leading to the vent valve piston chamber 62.

When the piston 25 is moved back to its extreme right hand position, the main and graduating valves assume the positions shown in the drawings, and the passages described are connected or blanked as illustrated.

The vent valve portion 19 contains a piston 70 disposed in the aforementioned piston chamber 62 and having a stem 71 connected to a vent valve 72 controlling communication between a passage 73 and a chamber 74 open to the atmosphere by way of a large port 75. The passage 73 connects with the safety control pipe 47 and the piston chamber 26 and is of course charged to the pressure of this pipe and chamber when the vent valve 72 is held upon its seat 76.

Vent valve 72 is urged toward its seat by a spring 77, and is adapted to be urged away from its seat when fluid under pressure is supplied to the piston chamber 62 at a rapid rate. When fluid is supplied to this chamber at a slow rate, it may leak past the piston 70 either by way of a leak port 78 around the piston or through a restricted port 79 in the piston, or by way of both. When, however, fluid under pressure is supplied to the piston chamber 62 at a rapid rate, sufficient pressure will build up in the chamber to actuate the piston 70 downwardly to unseat the vent valve 72, and thereby vent the safety control pipe 47, and piston chamber 26, to the atmosphere by way of the large port 75.

The straight air interlock valve portion 20 is provided with two valves 82 and 84 having a spring 85 interposed therebetween so as to urge the two valves in opposite directions. The valve 82 coacts with a seat 86 to control communication between a passage 87 and a chamber 88, while the valve 84 coacts with a similar seat 89 to control communication between another passage 90 and the chamber 88.

The valve 84 is connected by a stem 91 to a diaphragm 92, which is subject on one side to pressure of a spring 93 and on the other side to pressure of fluid in a chamber 94, which is connected by way of passage 95 to the safety control pipe 47. When fluid under pressure is supplied to the chamber 94 the diaphragm 92 is actuated to the left to hold the valve 84 unseated, and when the pressure in chamber 94 is reduced spring 93 actuates the diaphragm 92 to the right to seat the valve 84.

For either position of the valve 84 the spring 85 holds valve 82 seated, but when the valve 84 is seated and fluid under pressure is supplied to the passage 87, the valve 82 will be unseated at a relatively low pressure and fluid will then flow from the passage 87 to the chamber 88.

The chamber 88 is connected by passage 98 to a portion of a straight air pipe 100 which leads by way of the retardation controller device 13 to the brake cylinder 14. The passage 90 is connected to another portion of the straight air pipe 100 which leads to the brake valve device 11, while the passage 87 is at times in communication by way of a spring-loaded ball check valve 101 with the aforementioned passage 68 leading to the seat of the main slide valve 23. The valves 82 and 84 are therefore adapted to connect the portion of the straight air pipe 100 which leads to the brake cylinder with either the portion which leads to the brake valve device 11 or to the seat of the main slide valve 23.

Considering now the parts of the brake equipment shown, the brake valve device 11 is embodied in a casing having a pressure chamber 102, which may have fluid under pressure supplied thereto by operation of a supply valve 103, and which may have fluid under pressure released therefrom by operation of a release valve 104.

The supply valve 103 is urged toward seated position by a spring 105, but when unseated establishes a communication from the feed valve device 16 to the pressure chamber 102, by way of pipe 40, pipe and passage 106, and past the unseated valve 103.

The release valve 104 is carried by a movable abutment in the form of a piston 107, which is subject on its left hand side to pressure of fluid supplied to chamber 102 and on its right hand side to pressure exerted by a regulating spring 108. The release valve 104 is urged toward unseated position by a spring 109, and when unseated establishes a communication from the pressure chamber 102 to the atmosphere by way of passages 110 and 111, chamber 112, and exhaust passage 113.

Tension on the regulating spring 108 may be adjusted by an adjustable member 115, and movement of the movable abutment 107 to the right may be limited by engagement of a plunger 116, associated with the abutment, with a stop screw 117 associated with the regulating member 115.

For actuating the supply valve 103 to unseated position and the release valve 104 to seated position there are provided spaced levers 119 carried intermediate their ends at 120 by a slidable plunger 121, which interfits with a bore 122 in the casing. Between their upper ends the spaced levers 119 carry a stem 123 for engaging the supply valve 103. Between their lower ends the spaced levers carry a roller 124 for engaging the release valve 104.

The supply valve spring 105 and the release valve spring 109 urge the plunger 121 to the left, but when the plunger 121 is actuated to the right the relation of the two springs 105 and 109 is such that the spaced levers pivot about their upper ends until the release valve 104 has been seated, and then pivot about their lower ends to effect unseating of the supply valve 103. The amount which the supply valve 103 is unseated will depend upon the amount the plunger 121 is actuated to the right.

For actuating the plunger 121 to the right there is provided a cam 126 secured to a shaft 127 which is rotatable upon movement of a handle 128. The handle 128 has a biased or release position and is movable through an application zone to effect an application of the brakes. As the handle is moved into the application zone, the cam 126 progressively actuates the plunger 121 to the right. Now the parts are so designed that when the handle 128 is moved to some position in the application zone movement of the plunger 121 will effect unseating of the supply valve 103 and the supply valve will remain unseated until the pressure in chamber 102 has reached a value corresponding to the position of handle 128, at which time the pressure will have caused the movable abutment 107 to be actuated to the right far enough for spring 105 to seat the supply valve 103.

If the pressure in chamber 102 should exceed that corresponding to the position of handle 128, then movable abutment 107 will be actuated to the right far enough to unseat release valve 104, and thus reduce the pressure until it corresponds to the handle position. It will thus be seen that the pressure of fluid supplied to the chamber 102 will at all times correspond to the degree or extent of movement of the handle 128 into the application zone.

The safety control valve device 12 is embodied in a casing provided with a valve 130 which is urged toward seated position by a spring 131, and which is adapted to be urged toward unseated position by operation of a manual element 132. The manual element 132 is pivotally mounted at 133 and has a limited up and down movement as determined by a pin 134 disposed in an aperture 135 in the element 132.

A spring 136 urges the manual element upwardly, but when pressure is manually applied to the element it actuates a plunger 137 to the left, which by engagement with a diaphragm 138 moves the stem of valve 130 to unseat the valve. When the valve 130 is unseated a communication is established between the safety control pipe 47 and the feed valve device 16, by way of pipes 139 and 40. At the same time, the diaphragm 138 engages a seat rib 140 to close a communication between the safety control pipe 47 and an exhaust port 141.

When manually applied pressure is released from the element 132, spring 136 actuates the element upwardly while spring 131 seats the valve 130 and urges diaphragm 138 away from seat rib 140. The communication between the feed valve device 16 and the safety control pipe 47 is thus closed and the safety control pipe 47 is vented to the atmosphere by way of the exhaust port 141.

The retardation controller device 13 is embodied in a casing so positioned on the vehicle that when the train is decelerating an inertia responsive body 144 is actuated to the left. The distance which the body 144 is actuated to the left for any given rate of retardation is determined by the tension on a spring 145, which acts upon the right end of a slide valve 146, the left end of which has applied thereto a force corresponding to the force of inertia acting upon the body 144, this force being transmitted through a lever 147 pivotally mounted at 148.

The inertia responsive body 144 is provided on either side with flanges or wings 149 which are adapted to roll upon frictionless rollers 150. The limit of travel of the body 144 to the left may be determined by an adjustable screw 151.

When the body 144 moves to the left it shifts the slide valve 146 from a biased position to the left through various positions to an extreme position to the right where the slide valve connects the brake cylinder 14 to an exhaust port 152. Intermediate its extreme left hand and right hand positions, the side valve 146 blanks the exhaust port 152 and also the portion of the straight air pipe 109 leading from the valve mechanism 10, so that for this position of the slide valve the supply of fluid under pressure to the brake cylinder 14 will be lapped.

The retardation controller device is also provided with a spring-seated check valve 153, which will unseat to provide a by-pass communication between the two portions of the straight air pipe 109 at a time when the slide valve 146 blanks the left hand portion and when the pressure in the left hand portion is reduced below that in the right hand portion.

The tension on the spring 145 is normally constant, being determined by adjustment of a set screw 154, but may be increased by supply of fluid under pressure to a chamber 155 containing a piston 156. The pressure of fluid thus supplied to chamber 155 will actuate piston 156 to the left until it engages a wall 157 at which time the tension on spring 145 will be a maximum.

The circuit breaker operating cylinder 17 is embodied in a casing provided with a piston 160 disposed in the aforementioned piston chamber 59 and biased to the right by a spring 161. When fluid under pressure is supplied to the piston chamber 59 to a predetermined degree, the piston 160 and an associated stem 162 are actuated to the left to shift a handle 163 of a circuit breaker 164 from an "on" position to an "off" position, so as to disconnect the vehicle or train driving motors from the source of current supply.

The feed valve device 16 is preferably one of the types commonly employed in fluid pressure brake systems, the function of which, as is well known in the art, is to maintain the pressure of fluid supplied from the main reservoir 15 substantially constant. The main reservoir 15 is preferably connected to a compressor (not shown) and maintained at some pressure higher than the feed valve setting.

The operation of this embodiment of my invention is as follows:

*Running condition*

When the train is running under power or coasting, the handle 128 of the brake valve device 11 is maintained in release position. In release position the straight air pipe 100, and the pressure chamber 102, are maintained in communication with the atmosphere by way of the unseated release valve 104.

The safety control pipe 47 is maintained charged to the feed valve setting, by the operator maintaining a constant manually applied pressure to the element 132 of the safety control valve device 12. The quick action chamber 44 will then be charged from the safety control pipe 47, by way of passages 50 and 51, chamber 49, port 48, emergency piston chamber 26, port 46 and passage 45.

Chamber 94 in the straight air interlock valve portion 20 will be subject to safety control pipe pressure and the valves of this mechanism will be positioned as shown in the drawings. The other parts of the equipment not specifically referred to will assume substantially the positions shown in Fig. 1, and as a consequence the brake cylinder will be in communication with the atmosphere and the brakes thus released.

*Service application*

When it is desired to effect a service application of the brakes, the brake valve handle 128 is moved into the application zone to a degree or extent according to the desired degree of braking. Fluid under pressure will then be supplied to the chamber 102 to a degree corresponding to the position of handle 128. During this operation pressure is maintained on the manually operated element 132 of the safety control valve device 12.

From the chamber 102 fluid flows to the brake cylinder 14 by way of the first portion of the straight air pipe 100, passage 90, past the unseated valve 84, chamber 88, passage 96, the second portion of the straight air pipe 100, through the communication in the retardation controller device 13 formed by the slide valve 146, and through the third portion of the straight air pipe 100. The brakes will thus be applied to a degree according to the degree or extent of movement of the handle 128.

Now if for any reason there should be caused a slight reduction in safety control pipe pressure, either due to accident or due to lowering of pressure in pipes 49 and 139 (and hence in the safety control pipe) during a service application, the piston 25 in the valve mechanism 10 may be caused to move to the left. However, when the piston has moved far enough for port 65 in the graduating valve to register with port 63 in the main slide valve, slide valve chamber 22, and consequently the quick action chamber 44, will be connected to the atmosphere by way of exhaust port 55. The parts are so designed that for such reductions in safety control pipe pressure as will be encountered during service applications the fall or drop in pressure in slide valve chamber 22 will equal or exceed the fall or drop of pressure in the piston chamber 26, so that the piston will be arrested in its movement to the left and eventually be caused to move back to its right hand position by virtue of the overbalancing pressure in piston chamber 26. In this manner the valve mechanism 10 is prevented from operating due to slight variations in the safety control pipe pressure.

Now as the brakes are applied the train will begin to decelerate and the resulting inertia effect on the body 144 will cause the body to move to the left. If as the speed of the train diminishes and the coefficient of friction between the rubbing parts of the brakes increases, the body 144 should be caused to be moved far enough for slide valve 146 to blank the left hand portion of the straight air pipe, then no further supply to the brake cylinder can take place. If the slide valve 146 should be shifted to the right far enough to connect the right hand portion of the straight air pipe to exhaust port 152, then the pressure in the brake cylinder 14 will be reduced. This reduction in pressure will continue until the rate of retardation diminishes and the body 144 moves back to the right.

It should therefore be apparent that if the brake application is great enough the body 144 will move back and forth during deceleration to intermittently decrease brake cylinder pressure so as to prevent the rate of retardation from exceeding that determined by the tension placed on spring 145.

When it is desired to effect a release of the brakes the handle 128 is returned to release position. In release position fluid supplied to the straight air pipe 100, and consequently to the brake cylinder 14, will be released to the atmosphere past the unseated release valve 104 through the communication heretofore described. If, at the time the handle 128 is moved to release position, the slide valve 146 in the retardation controller device 13 should blank the left hand portion of the straight air pipe, then the check valve 153 will unseat to permit the flow of fluid from the right hand portion to the left hand portion of the connected straight air pipe.

*Emergency application*

When it is desired to effect an emergency application of the brakes pressure manually applied to the element 132 of the safety control valve device 12 is released, so that valve 130 is seated by its spring 131 and diaphragm 138 disengages from seat rib 140, to vent the safety control pipe 47 to the atmosphere by way of exhaust port 141. A reduction in safety control pipe pressure, and consequently the pressure in piston chamber 26 of the valve mechanism 10, will cause piston 25 to move to the left far enough to compress tail stop spring 31.

For this movement of the piston the graduating valve 24 will uncover the main slide valve port 60, so that fluid flows from the slide valve chamber 22 to the vent valve piston chamber 62. This flow will be at a rate fast enough to build up sufficient pressure to actuate the piston 70 downwardly and thus unseat the vent valve 72. Unseating of the vent valve 72 will further vent the safety control pipe 47 to the atmosphere by way of the large exhaust port 75. As a consequence of this further venting of the safety control pipe there will be a sharp drop in pressure in piston chamber 26, and to a degree such that the overbalancing pressure in slide valve chamber 22 will actuate the piston to its extreme left hand position. The main slide valve 23, which up to this time has remained at rest, is thus moved to application position.

In application position the main slide valve 23 uncovers the passage 61, so that fluid continues to flow to the vent valve piston chamber 62. At the same time, the main slide valve disconnects passage 56 from exhaust passage 55 and connects passage 39 leading to the feed valve device 16 to both passages 56 and 68. Fluid will then flow from the feed valve device through passage 68, unseating the spring-loaded check valve 101, and through passage 87 to the seat of valve 82.

Now when the safety control pipe pressure was reduced, the overbalancing pressure of spring 93 actuated diaphragm 92 to the right to seat valve 84 and to decrease the force acting on valve 82 by spring 85 to a very low value. Therefore, the pressure of fluid to the left of valve 82 will unseat this valve and fluid will then flow to chamber 88 and from thence to the second portion of the straight air pipe and to the brake cylinder 14 through the communication described for a service application. Since the brake cylinder has now been connected to the feed valve device the pressure ultimately established in the brake cylinder will be a maximum.

Fluid flowing from the feed valve device to the passage 56 flows by way of pipes 57 and 58 to the piston chamber 155 in the retardation controller device 13 and to the piston chamber 59 in the circuit breaker operating cylinder 17. Fluid supplied to the retardation controller chamber 155 will actuate piston 156 to the left to compress spring 145 to a maximum degree, since the pressure of fluid supplied to chamber 155 corresponds to feed valve pressure.

Similarly, fluid supplied to the piston chamber 59 in the circuit breaker operating cylinder 17 will actuate piston 160 to the left to shift handle 163 to "off" position, and thus open the circuit to the driving motors.

It will thus be seen that the valve mechanism 10 performs the functions of completely venting the safety control pipe to atmosphere, supplying fluid to the brake cylinder to a maximum degree, conditioning the retardation controller device to permit a maximum rate of retardation, and disconnecting the driving motors from the source of current supply. And it will be further observed that these functions are performed in a coordinated manner such that a maximum degree of application of the brakes results rapidly and in a highly effective manner.

Since the brakes will be applied to a maximum degree, a high rate of retardation will be produced and the body 144 of the retardation controller device will be actuated to the left. Due to the increased tension now existing on the spring 145, the slide valve 146 will not be shifted to its extreme right hand position until a rate of retardation much higher than permissible during a service application is attained. When this high rate has been attained and the slide valve 146 has been shifted to its extreme right hand position the brake cylinder pressure will be reduced until the rate diminishes to the point where the body 144 moves to the right far enough to terminate the release from the brake cylinder. In all other respects the functioning of the retardation controller device during an emergency application will be similar to its functioning during a service application.

In the brake equipment illustrated fluid under pressure is supplied to the brake cylinder 14 directly through the straight air pipe 100. In practice, however, a train will comprise a number of cars so that it is more desirable that a relay valve be provided on each car and connected to the straight air pipe so that fluid under pressure supplied to the straight air pipe operates the relay valves to in turn cause each to supply fluid under pressure from a local or supply reservoir to the brake cylinders on that car.

When such an arrangement is employed the pressure of fluid supplied to the straight air pipe should preferably not exceed the pressure obtaining in these local or supply reservoirs when they have equalized with the brake cylinders during either a full service or an emergency application. If the straight air pipe pressure should exceed the equalization pressure of the supply reservoirs, then the relay valve devices could not move to lap position, and if for any reason the communication between the supply reservoirs and the relay valve devices should be ruptured or opened to the atmosphere then the entire brake cylinder pressure would be lost. The relay valve devices should therefore be permitted to move to lap position so as to positively prevent this possible loss of brake cylinder pressure.

In order to insure that, in brake systems with which the valve mechanism 10 may be employed, the relay valves shall move to lap position, the spring-loaded check valve 101 has been provided. The spring loading of this check valve is such that the pressure of fluid supplied to the straight air pipe 100 will not exceed the equalization pressure of supply or local reservoirs connected to relay valve devices throughout the train.

Now while the main slide valve 23 in the valve mechanism 10 is in application position, fluid in the slide valve chamber 22 and quick action chamber 44 will eventually be released to the atmosphere through the restricted port 79 in the vent valve piston 70. Thereafter spring 77 will seat the vent valve 72.

When it is desired to effect a release of the brakes following an emergency application, pressure is again manually applied to the element 132 of the safety control valve device 12, so that the safety control pipe 47 may again be charged to feed valve pressure. As the pressure in the safety control pipe rises and fluid flows to piston chamber 26, piston 25 will be actuated back to its extreme right hand position. At the same time, the rise of pressure in chamber 94 will actuate diaphragm 92 to the left to unseat valve 84. Since the handle 128 of the brake valve device 11 remains in release position during an emergency application, fluid will be released from the brake cylinder 14 to the atmosphere through the brake valve device 11 by way of the same communication as during a release following a service application.

When the main slide valve 23 returns to its extreme right hand position, passage 56 leading to the retardation controller device and to the circuit breaker operating cylinder 17 will be connected to exhaust port 55, so as to release fluid under pressure from the piston chambers of these two devices.

It will be noted that for all positions of the main slide valve 23 fluid supplied to the chamber 37 above the loading diaphragm 34 remains at feed valve pressure, so that the main slide valve is held upon its seat regardless of the pressure acting to unseat the valve. Further, if at any time during operation of the main slide valve the diaphragm 34 should become ruptured, the choke 41 will prevent undue loss of fluid, (such as would occur when the slide valve chamber 22 is in communication with the vent valve piston chamber 62), so that the train may be stopped before main reservoir pressure will have been depleted to an unsafe value.

Figure 2:
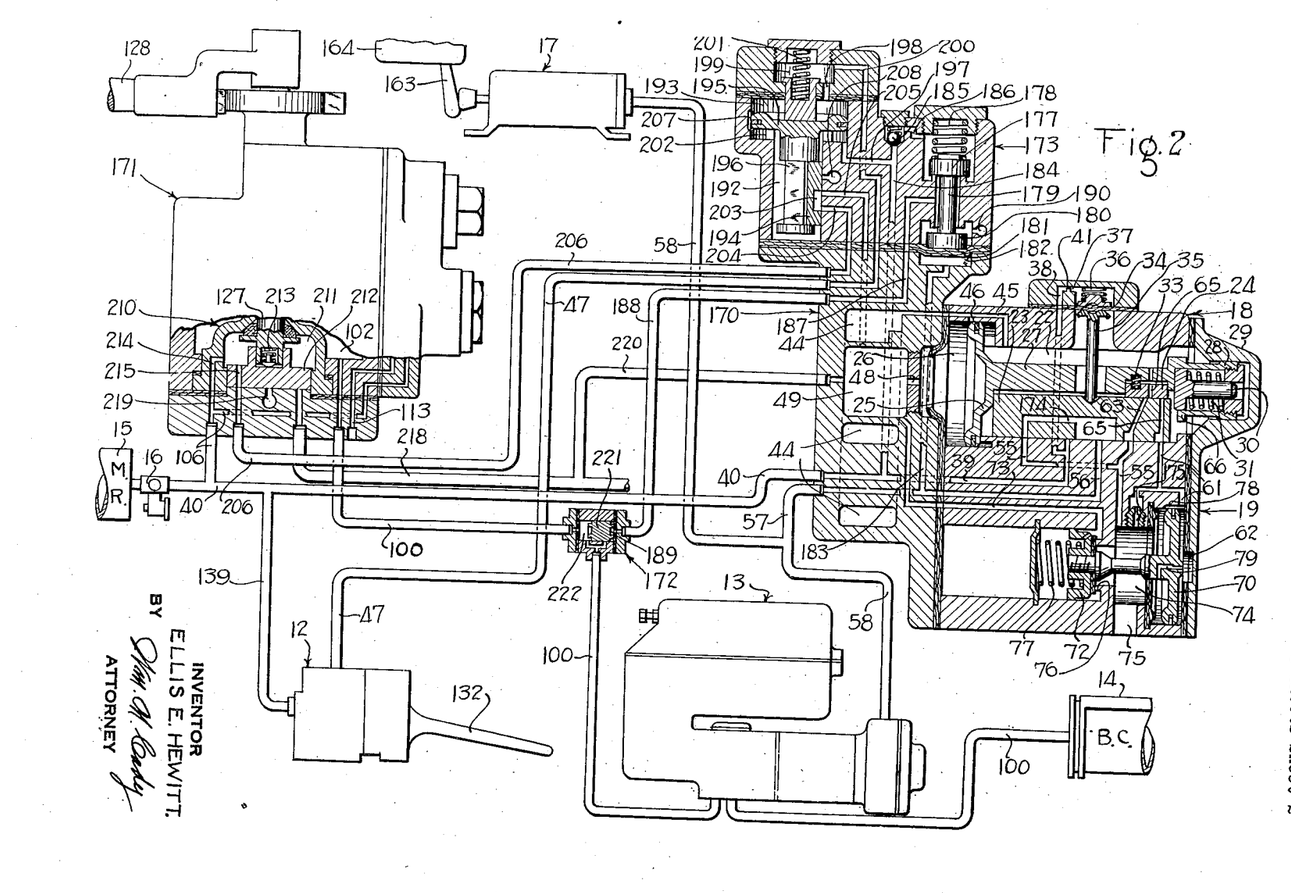
Fig. 2 is a view showing another embodiment of the invention in diagrammatic form in connection with a similar brake equipment.

*Embodiment shown in Fig. 2*

In this embodiment, my improved valve mechanism is shown at 170 as being associated with a brake equipment comprising the same devices as shown in Fig. 1, except that the brake valve device 11 of Fig. 1 has now been replaced by a brake valve device 171, and a double check valve device 172 has been added to the equipment.

The valve mechansim 170 is in many respects the same as the valve mechanism 10 of Fig. 1, and the parts in the two figures which correspond, or are substantial equivalents of each other, have been designated by like numerals. The description therefore of this embodiment will deal principally with the parts which differ from, or have been added to, the parts shown in Fig. 1.

The valve mechanism 170 differs principally from the valve mechanism 10 in that the porting of the main slide valve 23 has been changed slightly, the vent valve portion 19 has been changed slightly, the straight air interlock valve portion 20 has been omitted, and an application valve portion 173 has been added.

Considering first the porting of the main slide valve 23, the port 54 and cavity 67 of Fig. 1 have been omitted and a new port 174 has been provided, which in the extreme right hand position of the main slide valve connects passage 56 with exhaust port 55 in the valve seat. The exhaust port 55 has been shown in Fig. 2 as arranged slightly different from that in Fig. 1, but is the full equivalent thereof. In all other respects the porting of the main slide valve is the same as that in Fig. 1.

The vent valve portion 19 is substantially the same as that in Fig. 1, except however a by-pass choke 175 has been added to provide in parallel with the leak groove 78 an additional by-pass around the vent valve piston 70. This choke is removable and may be replaced by different size chokes, as circumstances may require.

The application valve portion 173 is provided with a supply valve 177, which is urged toward a seated position by a spring 178, and which has a stem 179 terminating in a release valve 180. When the supply valve 177 is seated the release valve 180 is unseated, and when the release valve 180 is seated the supply valve 177 is unseated.

The release valve 180 is engaged by a diaphragm 181 which is actuated upwardly when fluid under pressure is supplied to a chamber 182 to a predetermined degree, to seat the release valve 180 and consequently unseat the supply valve 177. The chamber 182 is connected by passage 183 to passage 56 leading to the seat of the main slide valve 23.

When the release valve 180 is seated and the supply valve 177 is unseated, fluid under pressure may flow from the passage 39, which leads to the feed valve device 16, through passage 184, past a spring-seated check valve 185, which will unseat, passage 186, past the unseated supply valve 177, and through passage 187 to a pipe 188 leading to a chamber 189 in the double check valve device 172. When the supply valve 177 is seated and the release valve 180 is unseated this communication is cut off and fluid supplied to the chamber 189 is released to the atmosphere past the unseated release valve and through exhaust port 190.

The application valve portion 173 is also provided with a slide valve chamber 192 and a piston chamber 193. Disposed in the slide valve chamber 192 is a slide valve 194 and disposed in the piston chamber 193 is a piston 195 having a stem 196 recessed to receive the slide valve 194, so as to move it coextensive with movement of the piston.

The slide valve chamber 192 is in communication with the feed valve device 16 by way of passages 197, 184 and 39 and pipe 40, while the piston chamber 193 is in communication with the safety control pipe 47 by way of port 198, chamber 199 and passage 200. A spring 201 in the chamber 199 urges the piston 195 downwardly toward engagement with stops 202.

When the piston 195 and slide valve 194 are in their lowermost positions a cavity 203 in the slide valve connects a passage 204 with another passage 205 leading to the chamber 49 in the main portion 18. The passage 204 is in communication with a charging pipe 206 leading to the brake valve device 171. When the piston 195 is in the lowermost position fluid may flow from the slide valve chamber 192 to the piston chamber 193 by way of feed groove 207.

When the pressure in piston chamber 193 is suddenly reduced the overbalancing pressure in slide valve chamber 192 will actuate piston 195 to its uppermost position, where the slide valve 194 will blank the passage 204 and connect passage 205 to exhaust port 208. For this movement of the piston the feed groove 207 will be closed so that the piston will remain in this uppermost position until fluid under pressure is again supplied to the piston chamber 193 sufficiently for it and spring 201 to overbalance the pressure in the slide valve chamber 192.

Considering now the brake valve device 171, this device is preferably the same as the brake valve device 11 of Fig. 1, except that a rotary valve portion 210 has been embodied therein. This valve portion comprises a casing having a chamber 211 in which is disposed a rotary valve 212 adapted to be rotated when the shaft 127 is rotated upon movement of the handle 128. A spring 213 assists in holding the rotary valve 212 upon its seat.

The chamber 211 is in communication through passage 214 with the aforedescribed pipe and passage 106 leading to the feed valve device 16, and when the handle 128 is in release position a port 215 in the rotary valve 212 connects the chamber 211 to the charging pipe 206. When the handle 128 is moved through the service zone this communication is maintained, but when the handle has passed beyond the service zone to a position which will be hereinafter referred to as emergency position, the rotary valve 212 blanks the charging pipe 206 and connects a brake pipe 218 to an exhaust port 219 by means of a port (not shown) in the rotary valve. The brake pipe 218 connects by way of branch pipe 220 to the chamber 49 in the valve mechanism 170, so that for this position of the brake valve handle the chamber 49, and the connected volumes, will be vented to the atmosphere.

The double check valve device 172 is embodied in a casing comprising a slide valve 221 subject on one side to pressure of fluid supplied to a chamber 222 and on the other side to pressure of fluid supplied to the aforementioned chamber 189. When the pressure in chamber 222 overbalances that in chamber 189 the slide valve 221 is actuated to the right to open communication between the two portions of the connected straight air pipe 100. When the pressure in chamber 189 overbalances that in chamber 222 the slide valve 221 is actuated to the left to blank communication with the first portion of the straight air pipe 100 and to establish communication between the second portion of the straight air pipe 100 and the aforementioned pipe 188.

The operation of this embodiment of my invention is as follows:

Running condition

When the train is running under power or coasting, the brake valve handle 128 is maintained in release position and the element 132 of the safety control valve device 12 is maintained in its lower position by pressure manually applied thereto, as described for the embodiment of Fig. 1. The safety control pipe 47 will therefore be charged to feed valve pressure, and as a consequence piston 195 in the valve mechanism 170 will be maintained in its lowermost position.

At the same time, fluid at feed valve pressure will be supplied to the piston chamber 26 through a communication which includes beginning at the feed valve device, pipe and passage 106, passage 214, rotary valve port 215, charging pipe 206, passage 204, slide valve cavity 203, passage 205, chamber 49 and port 48. Quick action chamber 44 will then be charged from the piston chamber 26. While the quick action chamber 44 has been shown in Fig. 2 as of apparent greater volume than that of Fig. 1, it is to be understood that these chambers are preferably of the same volume in both instances. The other parts of the brake equipment will be positioned as shown in the drawings, and the brake cylinder 14 will thus be in communication with the atmosphere, so that the brakes will be held released.

Service application

When it is desired to effect a service application of the brakes, the brake valve handle 128 is moved into the service zone to a degree according to the desired degree of braking. Fluid is then supplied to the straight air pipe 100 as in the case described with reference to Fig. 1. The apparatus shown in Fig. 2 therefore functions substantially the same as that shown in Fig. 1 for a service application of the brakes, the retardation controller device 13 operating to prevent the rate of retardation from exceeding a chosen maximum value.

As before noted, while the brake valve handle 128 is in the service application zone the charging pipe 206 is maintained in communication with the feed valve device 16, and should any slight drop in pressure occur during a service application, the main portion 18 of the valve mechanism 170 will function as described for the embodiment of Fig. 1 to prevent operation of the valve mechanism to application position.

A release of the brakes following a service application may be effected by returning the brake valve handle 128 to release position, thus venting the brake cylinder 14 to the atmosphere.

Emergency application

An emergency application of the brakes may be effected in either of two ways, first by moving the brake valve handle 128 to emergency position, or secondly by releasing the pressure manually applied to the element 132 of the safety control valve device 12, without moving the handle 128 from release position.

Considering the former method first, when the brake valve handle 128 is moved to emergency position, fluid under pressure is supplied to the straight air pipe 100 to a maximum degree, while at the same time the rotary valve 212 disconnects the charging pipe 206 from the chamber 211 and connects the brake pipe 218 to the exhaust port 219.

And as a result of venting of the brake pipe to the atmosphere, the pressure in piston chamber 26 is reduced and the overbalancing pressure in the slide valve chamber 22 will cause the piston 25 to move to the left to compress the tail stop spring 31. Thereafter the parts function as described for the embodiment of Fig. 1, and the main slide valve 23 will as a consequence be moved to application position. In application position, port 174 in the main slide valve connects passages 39 and 56, so that fluid at feed valve pressure flows to chamber 182 below diaphragm 181, and also to the retardation controller device piston chamber 155 and to the circuit breaker operating cylinder 17.

Fluid supplied to the chamber 182 is to a degree such that it actuates diaphragm 181 upwardly to seat release valve 180 and to unseat supply valve 177. Fluid at feed valve pressure then unseats the ball check valve 185 (which corresponds to the check valve 101 of Fig. 1) and flows past the unseated supply valve 177 and through passage 187 and pipe 188 to double check valve chamber 189. The slide valve 221 is then subject on its left hand side to fluid supplied to the first portion of straight air pipe 100 and on its right hand side to fluid supplied to the pipe 188. The pressure of fluid supplied to the chamber 189 will be greater than that supplied to the chamber 222, and accordingly slide valve 221 will be actuated to the left and fluid will flow from the valve mechanism 170 to the brake cylinder.

If, however, for any reason the supply from the valve mechanism 170 should fail, or diminish in pressure below that supplied to the chamber 222, then slide valve 221 will shift to the right, and fluid will then flow from the brake valve device 171 to the brake cylinder. There is therefore available two supplies so as to insure that an application of the brakes shall be effected in emergencies.

During this type of emergency application the pressure in the safety control pipe 47 is not disturbed to any appreciable extent, and as a consequence the piston 195 will remain in its lowermost position.

Fluid supplied to the retardation controller piston chamber 155 will adjust the retardation controller device for its maximum setting, so as to prevent the rate of retardation from exceeding the higher chosen value, while fluid supplied to the circuit breaker operating cylinder 17 will disconnect the driving motors from the source of current supplied.

To effect a release of the brakes following this type of emergency application, the brake valve handle 128 is returned to release position, where the straight air pipe 100 is again connected to the atmosphere, and where the charging pipe 206 is again connected to chamber 211. Fluid is then again supplied at feed valve pressure to the piston chamber 26, so that piston 25 returns to its right hand position, where main slide valve 23 vents the chambers 59, 155 and 182 to the atmosphere. The parts will then assume the positions shown in the drawings and the brakes will be quickly released, due to release of fluid under pressure from the brake cylinder to the atmosphere past the now unseated release valve 180.

When it is desired to effect an emergency application of the brakes by operation of the safety control valve device 12, pressure manually applied to the element 132 is released, and the safety control pipe 47 thus vented to the atmosphere. As a consequence the pressure in piston chamber 193 will be reduced and piston 195 will move to its uppermost position. In this position slide valve 194 disconnects the charging pipe 206 from the passage 205 leading to piston chamber 26, and connects passage 205 to the exhaust port 208. The pressure in piston chamber 26 will thus be reduced and the parts of the main valve portion 18 will function as before described to shift the main slide valve 23 to application position.

In application position of the main slide valve the same communications are established as just previously described for the other type of emergency application, and the brakes will thus be applied in a similar manner.

It will be noted that since the passage 204 is blanked by slide valve 194, and since the handle 128 of the brake valve device has remained in release position, there can be no loss of fluid supplied to the charging pipe 206 during this type of emergency application. However, the brake pipe 218 is vented to the atmosphere, so that it must be recharged when effecting a release of the brakes following this type of emergency application.

The retardation controller device 13 will of course function as before. It is to be noted that the retardation controller device is effective in controlling all applications of the brakes, both service and emergency applications, whether effected by supply of fluid from the brake valve device 171 or by supply from the valve mechanism 170.

When it is desired to effect a release of the brakes following this type of emergency application pressure is again applied to the element 132 and the safety control pipe 47 again charged from the feed valve device 16. Piston 195 and slide valve 194 will then be returned to their lowermost positions where charging pipe 206 will again be connected to chambers 26 and 49, from which the brake pipe 218 may again be charged. The parts will then return to the release position shown in the drawings.

Figure 3:
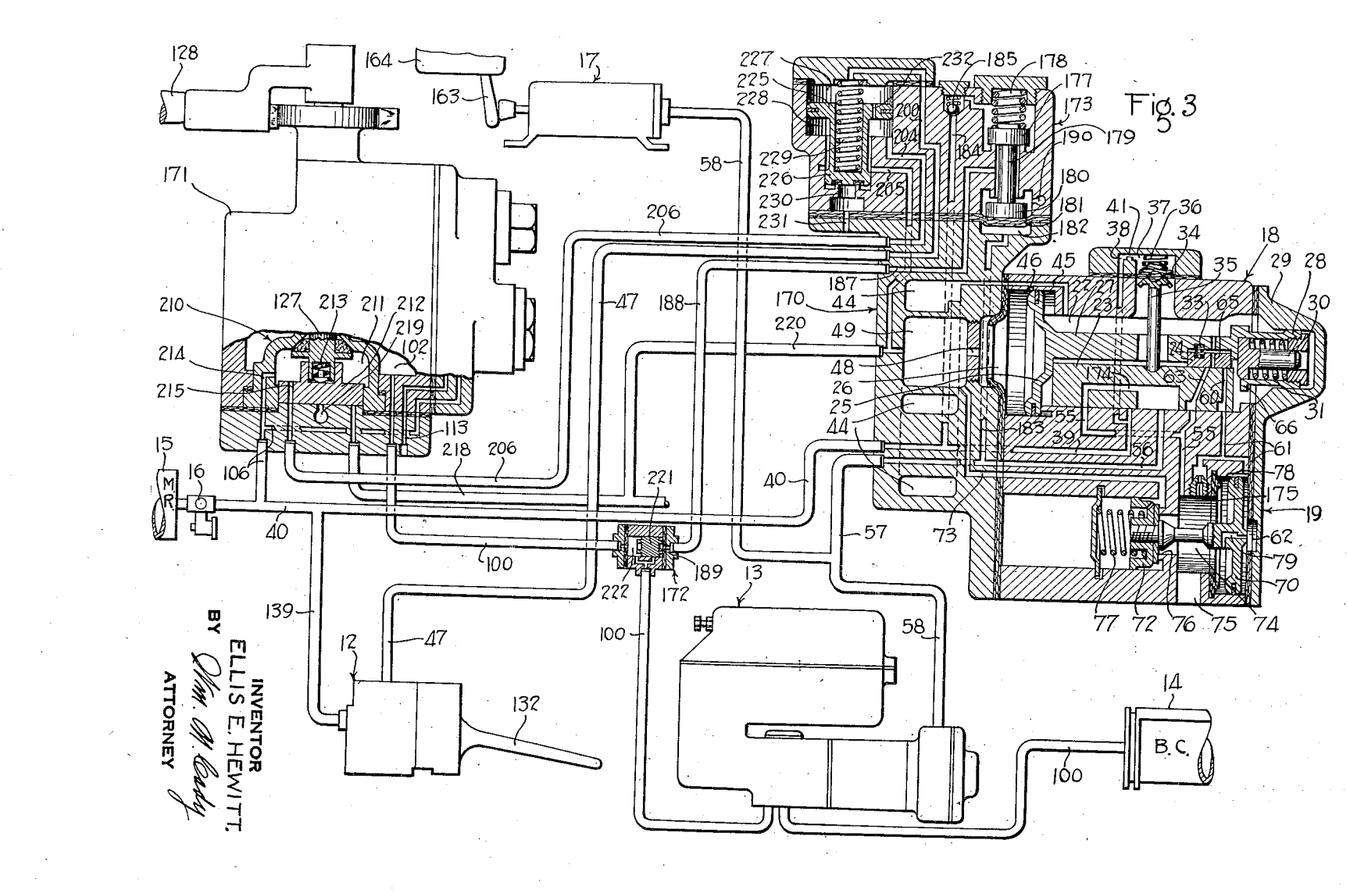
Fig. 3 is still another embodiment of the invention shown in diagrammatic form in connection with the brake equipment shown in Fig. 2.

*Embodiment shown in Fig. 3*

The embodiment shown in Fig. 3 is essentially the same as that shown in Fig. 2, except that the left hand section of the application valve portion 173 of the valve mechanism 170 has been replaced by a different and improved design, which is less costly to manufacture and to maintain. The piston 195 and slide valve 194 of Fig. 2 have been replaced by a piston 225 and a connected valve 226. The piston 225 is subject on its upper side to fluid supplied to a chamber 227 and on its lower side to fluid supplied to a chamber 228, and when the pressures in these two chambers are approximately equal a spring 229 urges the valve 226 to seated position upon a seat 230.

The chamber 227 is connected by the aforementioned passage 200 to the safety control pipe 47, while the chamber 228 is in open communication with the passage 204 leading to the charging pipe 206. The aforementioned passage 205 is also in communication with chamber 228 so long as the valve 226 is seated. When the pressure in chamber 227 is suddenly reduced so that piston 225 is actuated upwardly, valve 226 is shifted to unseated position to connect passage 205 to the atmosphere by way of exhaust port 231.

The operation of this embodiment is substantially the same as that shown in Fig. 2. When the equipment is being charged the chamber 227 is charged from the safety control pipe 47, while the chamber 228 is charged from the brake valve device 171 through the charging pipe 206. A restricted port 232 in piston 225 functions to maintain the pressures on either side of the piston 225 substantially equal during running condition.

A service application of the brakes is effected in the same manner and the equipment operates as described in connection with the embodiment of Fig. 2.

When an emergency application is initiated from the brake valve device 171, the pressure in chamber 228 is reduced along with that of the brake pipe 218. Valve 226 will therefore remain seated and consequently the charging pipe 206 will also be vented with the brake pipe. However, this pipe is at this time blanked at the seat of rotary valve 212 so that there is no loss of fluid from the feed valve device 16. The restricted port 232 in piston 225 is so small that the flow of fluid from chamber 227, and the safety control pipe 47, to chamber 228 during this type of emergency application is inappreciable and no undue loss of fluid results because of this port.

When an emergency application is effected by releasing pressure on the element 132 of the safety control valve device 12, the pressure in chamber 227 is reduced and piston 225 is shifted to its uppermost position due to the overbalancing pressure in chamber 228, to unseat valve 226. Valve 226 then closes communication between passages 204 and 205 and connects passage 205 to the atmosphere by way of exhaust port 231. The brake pipe 218 and piston chamber 26 are thus vented to the atmosphere, and the valve mechanism 170 thereafter functions as before described in connection with Fig. 2. A release of the brakes is also effected the same as in the embodiment of Fig. 2.

It will thus be seen that I have provided a novel valve mechanism peculiarly adapted for use in connection with high speed train brake systems, and while I have described my invention with reference to three embodiments thereof I do not wish to be limited to the specific arrangements shown or otherwise than by the spirit and scope of the appended claims.

Having now described my invention, what I claim as new and desire to secure by Letters Patent, is:

1. In a fluid pressure brake system, in combination, a first valve for controlling a first communication through which fluid under pressure is supplied to effect an application of the brakes, a second valve for controlling a second communication through which fluid under pressure is also supplied to effect an application of the brakes, spring means interposed between said two valves and urging said two valves in a direction to close said two communications, and fluid pressure operated means for controlling opening and closing of at least one of said valves.

2. In a fluid pressure brake system, in combination, means defining a chamber to which fluid under pressure is supplied in effecting an application of the brakes, a first valve controlling communication to said chamber from a source of supply, a second valve for controlling a different communication to said chamber from said source of supply, spring means urging said two valves toward closed position, said spring means permitting one of said valves to be opened upon supply of fluid under pressure to the communication controlled thereby, and fluid pressure operated means for controlling opening of the other of said valves.

3. In a fluid pressure brake system, in combination, an automatic pipe, a straight air pipe, a source of fluid under pressure, a controlling valve mechanism controlling a communication through which fluid under pressure is supplied to said straight air pipe and operated upon a reduction in fluid pressure in said automatic pipe for supplying fluid under pressure from said source to said straight air pipe, and a valve device operated upon a reduction in fluid pressure in said automatic pipe for establishing the communication through which said controlling valve mechanism supplies fluid from said source to said straight air pipe.

4. In a fluid pressure brake system, in combination, an automatic pipe, a straight air pipe, a source of fluid under pressure, a controlling valve device controlling a communication through which fluid under pressure is supplied to said straight air pipe and operated upon a reduction in fluid pressure in said automatic pipe for supplying fluid under pressure from said source to said straight air pipe, a second valve device operated upon a reduction in fluid pressure in said automatic pipe for establishing the communication through which said controlling valve device supplies fluid from said source to said straight air pipe, and means for limiting the degree of fluid pressure supplied from said source to said straight air pipe.

5. In a fluid pressure brake system, in combination, an automatic pipe, a straight air pipe, a source of fluid under pressure, a controlling valve device controlling communication through which fluid under pressure is supplied to said straight air pipe and operated upon a reduction in fluid pressure in said automatic pipe for supplying fluid under pressure from said source to said straight air pipe, a second valve device operated upon a reduction in fluid pressure in said automatic pipe for establishing the communication through which said controlling valve device supplies fluid from said source to said straight air pipe, and a loaded check valve for limiting the degree of fluid pressure supplied from said source to said straight air pipe.

6. In a fluid pressure brake system, in combination, an automatic pipe, a straight air pipe, a source of fluid under pressure, a controlling valve device operated by fluid under pressure in the automatic pipe for closing a communication through which fluid under pressure is supplied from said source to said straight air pipe and for establishing another communication through which fluid under pressure is supplied to said straight air pipe, and operated upon a reduction in pressure in said automatic pipe for opening said first communication and closing said second communication, and an emergency valve device operated upon a reduction in pressure in said automatic pipe for establishing communication through which said controlling valve device supplies fluid under pressure from said source to said straight air pipe.

7. In a fluid pressure brake system, in combination, an automatic pipe, a straight air pipe, an increase in pressure in which operates to effect an application of the brakes, a source of fluid under pressure, a vent valve device operated upon an increase in fluid pressure for venting fluid from said automatic pipe, an emergency valve device subject to the opposing pressures of said automatic pipe and a quick action chamber and operated upon a reduction in fluid pressure in said automatic pipe for supplying fluid from said quick action chamber to operate said vent valve device, and a valve device for controlling a communication through said emergency valve device through which fluid under pressure is supplied to said straight air pipe and operated upon a reduction in fluid pressure in said automatic pipe for supplying fluid under pressure from said source to said straight air pipe.

8. In a fluid pressure brake system, in combination, an automatic pipe, a straight air pipe, an emergency valve device of the type which is subject to the opposing pressures of the automatic pipe and a quick action chamber and which when operated upon a sudden reduction in pressure in the automatic pipe causes the pressure in the quick action chamber to be reduced substantially to atmospheric pressure, and a controlling valve device operated upon a reduction in pressure in the automatic pipe for supplying fluid under pressure to said straight air pipe, said emergency valve device being operated upon a reduction in pressure in the automatic pipe to establish communication through which said controlling valve device supplies fluid under pressure to the straight air pipe.

ELLIS E. HEWITT.